United States Patent
Battagin et al.

(10) Patent No.: US 7,195,150 B2
(45) Date of Patent: Mar. 27, 2007

(54) REAL TIME DATA FROM SERVER

(75) Inventors: Daniel C. Battagin, Bellevue, WA (US); Shahar Prish, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/018,557

(22) Filed: Dec. 20, 2004

(65) Prior Publication Data
US 2006/0131383 A1 Jun. 22, 2006

(51) Int. Cl.
*G06K 7/10* (2006.01)
(52) U.S. Cl. .................... 235/377; 235/375; 715/503
(58) Field of Classification Search ............... 235/377, 235/378, 381, 486, 375; 705/52, 60, 61, 705/77, 32; 715/500, 503, 504
See application file for complete search history.

(56) References Cited

U.S. PATENT DOCUMENTS

| | | | | |
|---|---|---|---|---|
| 5,760,382 A | * | 6/1998 | Li et al. ................... | 235/436 |
| 5,812,991 A | * | 9/1998 | Kara ........................ | 705/410 |
| 5,926,822 A | * | 7/1999 | Garman .................... | 715/503 |
| 6,055,548 A | * | 4/2000 | Comer et al. ............. | 715/503 |
| 6,215,735 B1 | * | 4/2001 | English et al. ............ | 368/28 |
| 6,542,905 B1 | * | 4/2003 | Fogel et al. ............... | 707/200 |
| 6,945,458 B1 | * | 9/2005 | Shah et al. ................ | 235/385 |
| 2002/0112171 A1 | * | 8/2002 | Ginter et al. .............. | 713/185 |
| 2002/0120538 A1 | * | 8/2002 | Corrie et al. .............. | 705/35 |
| 2003/0149571 A1 | * | 8/2003 | Francesco et al. ......... | 705/1 |
| 2003/0208537 A1 | * | 11/2003 | Lane et al. ................ | 709/204 |
| 2004/0044753 A1 | * | 3/2004 | Toyoshima et al. ........ | 709/223 |
| 2004/0210464 A1 | * | 10/2004 | Belanger et al. .......... | 705/7 |
| 2004/0255148 A1 | * | 12/2004 | Monteiro et al. .......... | 713/200 |

FOREIGN PATENT DOCUMENTS

EP 1 398 717 A 3/2004

OTHER PUBLICATIONS

VistaSource, Inc., "VistaSource announces Anyware Real Time WebSheet for web-enhanced retrieval, analysis, and publishing of real time market data", Internet article, http://www.vistasource.com/vs2/pdf/news_Jun. 19, 2001.pdf>, Jun. 19, 2001, 1 pg.
Getsch, Tim et al., "Real-Time Data: Frequently Asked Questions", Microsoft Developer Network, http://msdn.microsoft.com/library/default.asp?url=/library/enus/dnexc12k2/htm/odc_xlrtdfaq.asp?, Jul. 2001, 7 pgs.
Anonymous, "Real Time Quotes Excel Downloads Real-time Stock, Index, Futures, Options & Mutual Fund Quotes Into Microsoft Excel® Spreadsheets", Internet Article, http://web.archive.org/web/20041012060753/http://www.ozgrid.com/Services/excel-real-time-quotes.htm>, Oct. 12, 2004, 4 pgs.

* cited by examiner

*Primary Examiner*—Thien M. Le
*Assistant Examiner*—Edwyn Labaze
(74) *Attorney, Agent, or Firm*—Merchant & Gould P.C.

(57) ABSTRACT

Data is obtained from one or more data sources. The data sources may be real time data sources and non-real time data sources. Calculations may be performed on the data before delivering the data to one or more applications. A direct connection may be established between a first computing device and a second computing device. The direct connection may be used to deliver the data. The data may be broadcast to one or more applications. For example, the broadcast may be to a different subnets within one or more networks.

20 Claims, 5 Drawing Sheets

REAL TIME DATA FROM SERVER

BACKGROUND OF THE INVENTION

Many organizations rely on real time data to service their clients. For example, a stock broker relies on receiving real time stock quotes. Brokers unable to receive the real time stock data are at a distinct disadvantage as compared to brokers who receive the real time stock data. In order to obtain this real time data, the organization must invest a lot of time, effort, and money in developing custom programs to process and deliver the real time data to its customers. Maintaining this specialized code may also be very costly as well as difficult. For example, whenever the real time data feed changes, a programmer is required to modify the code to handle the format change.

SUMMARY OF THE INVENTION

Embodiments of the present invention are related to providing real time data.

According to one aspect of the invention, data is obtained from one or more data sources. The data sources may be real time data sources and non-real time data sources.

According to another aspect of the invention, calculations may be performed on the data before delivering the data to one or more applications.

According to another aspect of the invention, a direct connection may be established between a first computing device and a second computing device. The direct connection may be used to deliver the data.

According to a further aspect of the invention, the data may be broadcast in real time (as the calculations take place and/or as new data is received from the data sources) to one or more applications. For example, the broadcast may be to a different subnets within one or more networks.

DETAILED DESCRIPTION OF THE PREFERRED EMBODIMENT

Generally, embodiments of the present invention are related to providing real time data. Data is obtained from one or more data sources. The data sources may be real time data sources and non-real time data sources. Calculations may then be performed on the data before delivering the data to one or more applications. The data may be delivered to the application in many different ways. For example, the data may be delivered through a direct connection that has been established between computing devices. The data may also be delivered by broadcasting the data to one or more applications.

Illustrative Real Time Data System

Figure 3:
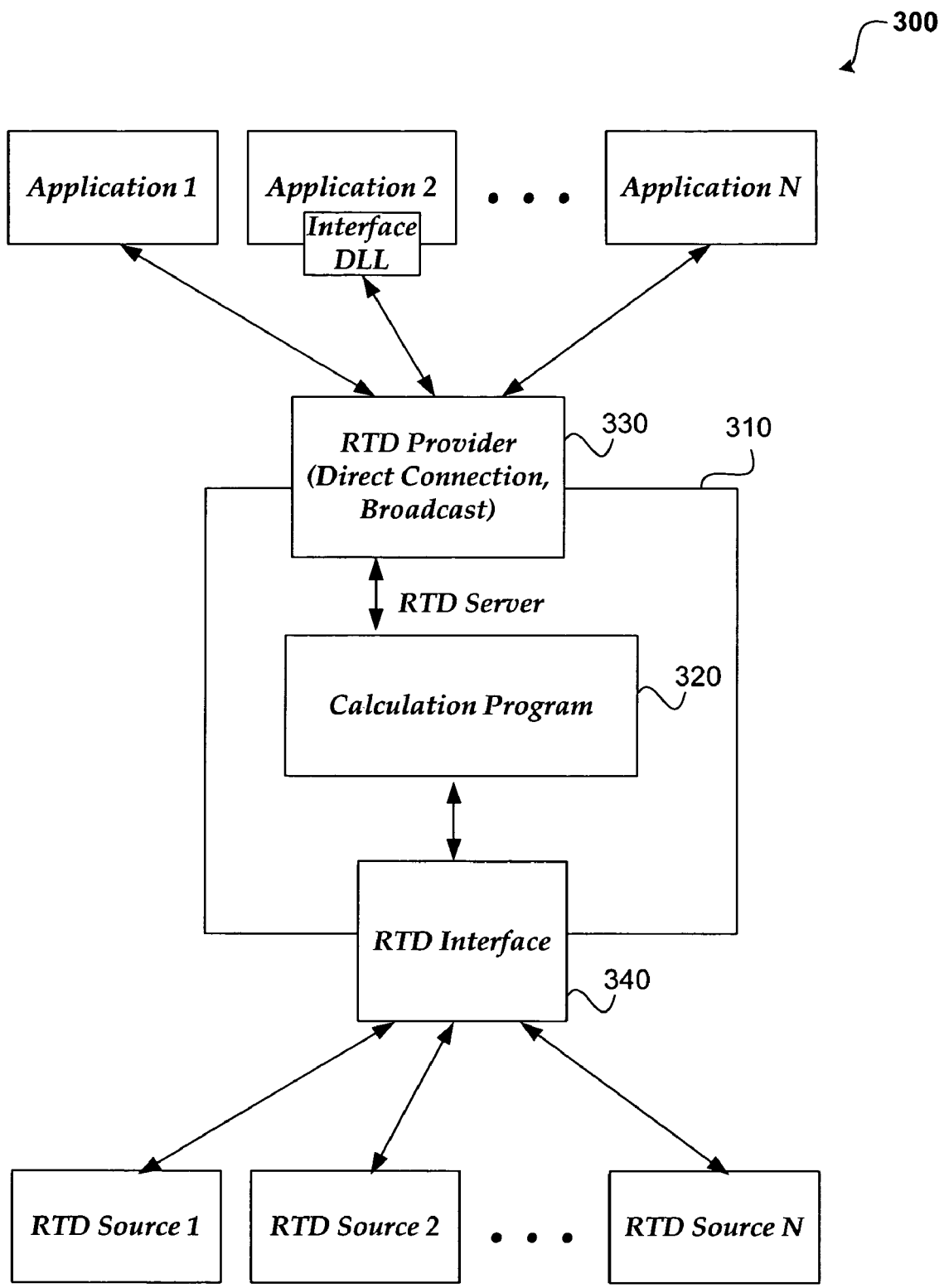
FIG. 3 illustrates a server providing real time data.

FIG. 3 illustrates a server providing real time data, in accordance with aspects of the present invention. As illustrated, system 300 includes real time data (RTD) server 310, calculation program 320, RTD interface 340, RTD provider 330, applications 1-N, and RTD sources 1-N.

RTD server 310 includes calculation program 320, RTD provider 330 and RTD Interface 340. Server 310 is configured to obtain data through RTD interface 340. RTD interface 340 may be coupled to one or more data sources, such as RTD sources 1-N. The data may be obtained from a variety of data sources, such as a real time data source, a database, or some other data store. For example, RTD source 1 may feed real time data to RTD server 310 through RTD interface 340. RTD source 2 could be a data store that is coupled to RTD interface 340 to obtain data used by RTD server 310. According to one embodiment of the invention, each of the RTD sources provide RTD server 310 with real time data.

RTD interface 340 may be implemented many different ways. For example, RTD interface 340 may be a single program that is developed to interact with each RTD source. RTD interface 340 may also be implemented as more than one program. For instance, each of the N RTD sources could be coupled to a separate RTD interface program. According to one embodiment of the invention, the specific programming code used to connect to the data source (RTD sources 1-N) to RTD server 310 are dynamic link libraries (DLLs) that are installed on server 310. Installation of the RTD interface DLLs on the server helps to ensure that the real time data system is secure.

The RTD DLLs may be developed by many different organizations. For example, the organization that supplies the RTD source may develop the DLL that interfaces with its data. Additionally, the user of the data and/or another organization may develop the RTD DLL. Generally, each DLL will be specific to the data source that is interfaced to RTD server 310.

Calculation program 320 is coupled to RTD interface 340 and RTD provider 330. Calculation program 320 is configured to perform calculations on the incoming data provided by RTD interface 340 before the data is delivered to the client, such as applications 1-N. According to one embodiment of the invention, calculation program 320 is a spreadsheet application that resides on a server and provides results to users on a network (See FIG. 4 and related discussion). Before supplying the RTD data to the applications, calculation program 320 may be configured to perform calculations on the data through easy to use spreadsheet formulas. For example, a user could enter formulas within a spreadsheet to perform calculations. The user does not need to know how to program in order to perform calculations on the data.

RTD provider 330 is configured to provide applications with the real time data that has been processed by RTD server 310 and calculation program 320. The applications may be many different types of applications. For example, the application may be a web browser, a line of business (LOB) application, a spreadsheet application, a financial program, and the like. Applications 1-N are configured to receive the data from server 310. For example, a DLL, such as an interface DLL, may be used by the application to format the data into a compatible format.

RTD provider 330 may deliver the data through many different means. RTD provider 330 may also be configured to directly connect with one or more of the applications. For example, a socket connection could be established between the RTD provider and an application through which the data could be delivered.

RTD provider 330 may also be configured to broadcast the data. For example, a setting could be configured on server 310 instructing it to broadcast data to a particular subnet on a network. RTD server 310 may be configured to implement one or more of these delivery methods at the same time. For example, some applications could receive the data through a broadcast, while other applications directly connect to RTD provider 330.

Although only one RTD server is illustrated, more than one RTD server may be used to obtain and receive the data. For instance, a server could be configured to handle each different type of data source.

The following example applies when calculation program 320 is a spreadsheet program. When a user desires to receive real time data and have the ability to perform calculations on the data at server 310, the user includes an RTD function on a spreadsheet that includes a variety of parameters. This information may be referred to as a "topic." When a user creates a RTD function or opens a file containing a RTD function, calculation program 320 provides updates to the cells within the sheet that have changed based on changes from relating to receiving the real time data. When calculation program 320 determines that data has changed, it calls RTD provider 330 and delivers the changed data to the applications that have requested the data. According to one embodiment, when new data is received from a data source, only the cells that are dependent upon the data are recalculated. This saves time, as compared to recalculating every formula within every sheet.

An automatic calculation mode allows server 310 to perform calculations on the real time data as it is received. Server 310 also maintains a list of the data that changed in response to the recently received real time data.

Figure 4:
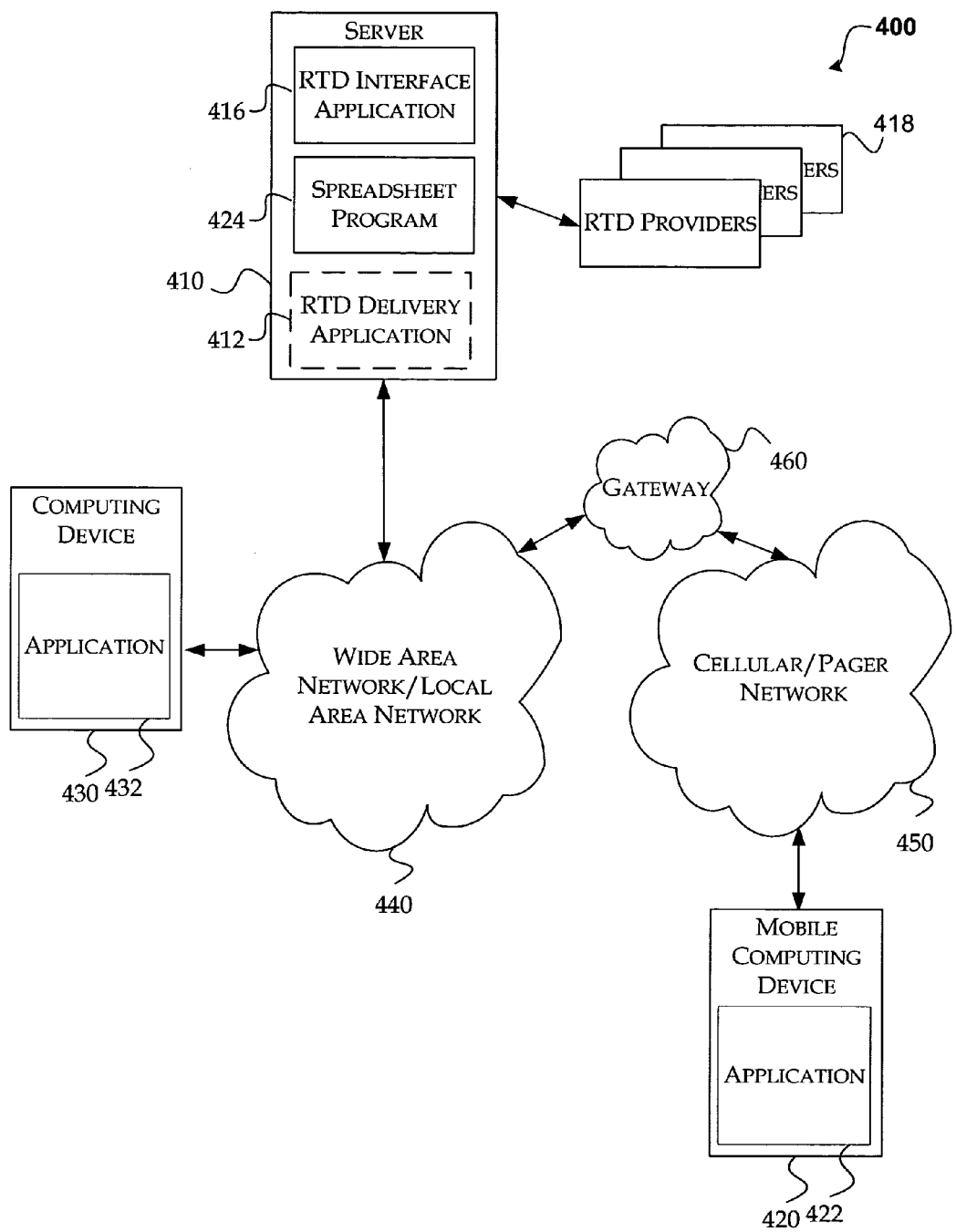
FIG. 4 is a functional block diagram generally illustrating a real time data system.

FIG. 4 is a functional block diagram generally illustrating a real time data system 400, in accordance with aspects of the invention. Server 410 and computing device 430 are computing devices such as the one described in conjunction with FIG. 1 and mobile device 420 is a mobile computing device such as the one described in conjunction with FIG. 2.

A user may receive real time data that has been processed by server 410 on devices 420 and/or 430. Applications 422 and 432 residing on mobile device 420 and computing device 430 are configured to interact with spreadsheet program 424 on server 410. According to one embodiment, application 422 and 432 is a web browser. Application 422 and 432 are configured to communicate with server 410 using any one of several client-server protocols.

According to one embodiment, server 410 runs spreadsheet program 424. Spreadsheet program 424 is configured to interact with clients 420 and 430. Data may be transmitted between the computing devices and the server over a wide area network (WAN)/local area network (LAN) 440. The clients may also interact with the spreadsheet workbooks that are stored on server 410. The workbooks are calculated on server 410 and then rendered to the user's web browser as HTML with interactivity (no ActiveX, no Applets, etc). The following example is presented for further clarification.

Suppose that an equities data provider wants to do calculations in a spreadsheet based on real-time stock market data, and then provide that information to subscribers. Server 410 is configured to calculate workbooks that interact with the real-time data sources (418) selected by the equities data provider. RTD interface application 416 is configured to interact with RTD providers 418. The equities data provider can author the workbooks to retrieve the real-time equities data and then based on the data that is received perform additional calculations within the spreadsheet workbook model on server 410. The workbook resulting from the calculations is then exposed as a real-time data source to the equities data provider's subscribers (e.g. a user of computing device 420 and/or a user of computing device 430) who can then view the data in their own spreadsheet or some other application. Optional RTD delivery application 412 is configured as an interface between spreadsheet program 424 and applications 422 and 432. Instead of the equities data provider having to develop specialized code to perform calculations on the real time data, they may place formulas within a workbook that is stored on server 410. When new data is received on server 410 the appropriate cells within the workbook are calculated using the formulas. No advanced programming knowledge is needed by the equities provider. Anyone that has knowledge of how to use a spreadsheet, can create a workbook that provides RTD to an application(s) that is interested in receiving the data.

Cellular/pager network 450 is a network responsible for delivering messages to and receiving messages from wireless devices. The cellular/pager network 450 may include both wireless and wired components. For example, cellular/pager network may include a cellular tower that is linked to a wired telephone network. Typically, the cellular tower carries communication to and from cell phones, long-distance communication links, and the like.

Gateway 460 routes messages between cellular/pager network 450 and WAN/LAN 440. For example, a computer user may send a message that is addressed to a cellular phone. Gateway 460 provides a means for transporting the message from the WAN/LAN 440 to cellular/pager network 450. Conversely, a user with a device connected to a cellular network may be browsing the Web. Gateway 460 allows hyperlink text protocol (HTTP) messages to be transferred between WAN/LAN 440 and cellular/pager network 450.

Process for Providing Real Time Data

Figure 5:
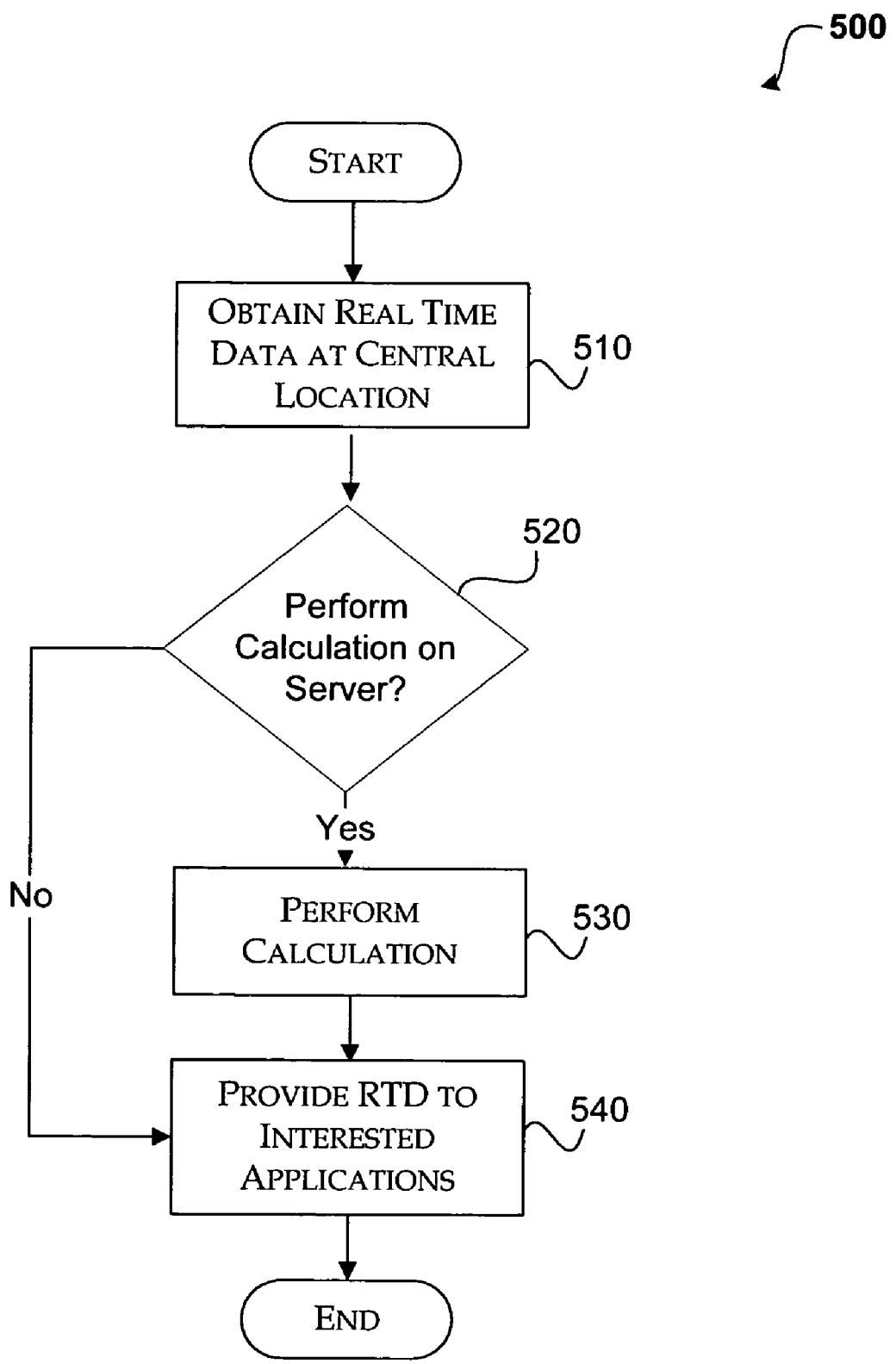
FIG. 5 illustrates a process for providing real time data; in accordance with aspects of the invention.

FIG. 5 illustrates a process for providing real time data, in accordance with aspects of the present invention.

After a start block, the process flows to block 510 where data is received at a central location. According to one embodiment, the central location is a server and the data is real time data that is obtained from a real time data source. Instead of providing the real time data directly to each application that is interested in receiving the data and requiring that application to process the data, one or more servers are used to retrieve and process the data. In this way, calculations may be performed on the server without requiring the applications to perform calculations.

Moving to decision block 520, a determination is made as to whether any calculations are to be performed on the data before it is provided to the interested applications. The calculations performed depend upon the interested applications. For example, according to one embodiment of the invention, the calculations are spreadsheet calculations.

When no calculations are to be performed, the process moves to block 540 where the data is provided to the interested applications. As discussed herein, the data may be provided to the applications in many different ways, including, but not limited to: through a direct connection; and through broadcasting.

When calculations are to be performed, the process moves to block 530 where the calculation is performed. The process then moves to block 540, where the data is provided to the application. According to one embodiment of the invention, formulas within a spreadsheet have been applied to real time data before delivering the data to a user's browser that is coupled the server.

The process then moves to an end block and returns to processing other actions.

Illustrative Operating Environment

Figure 1:
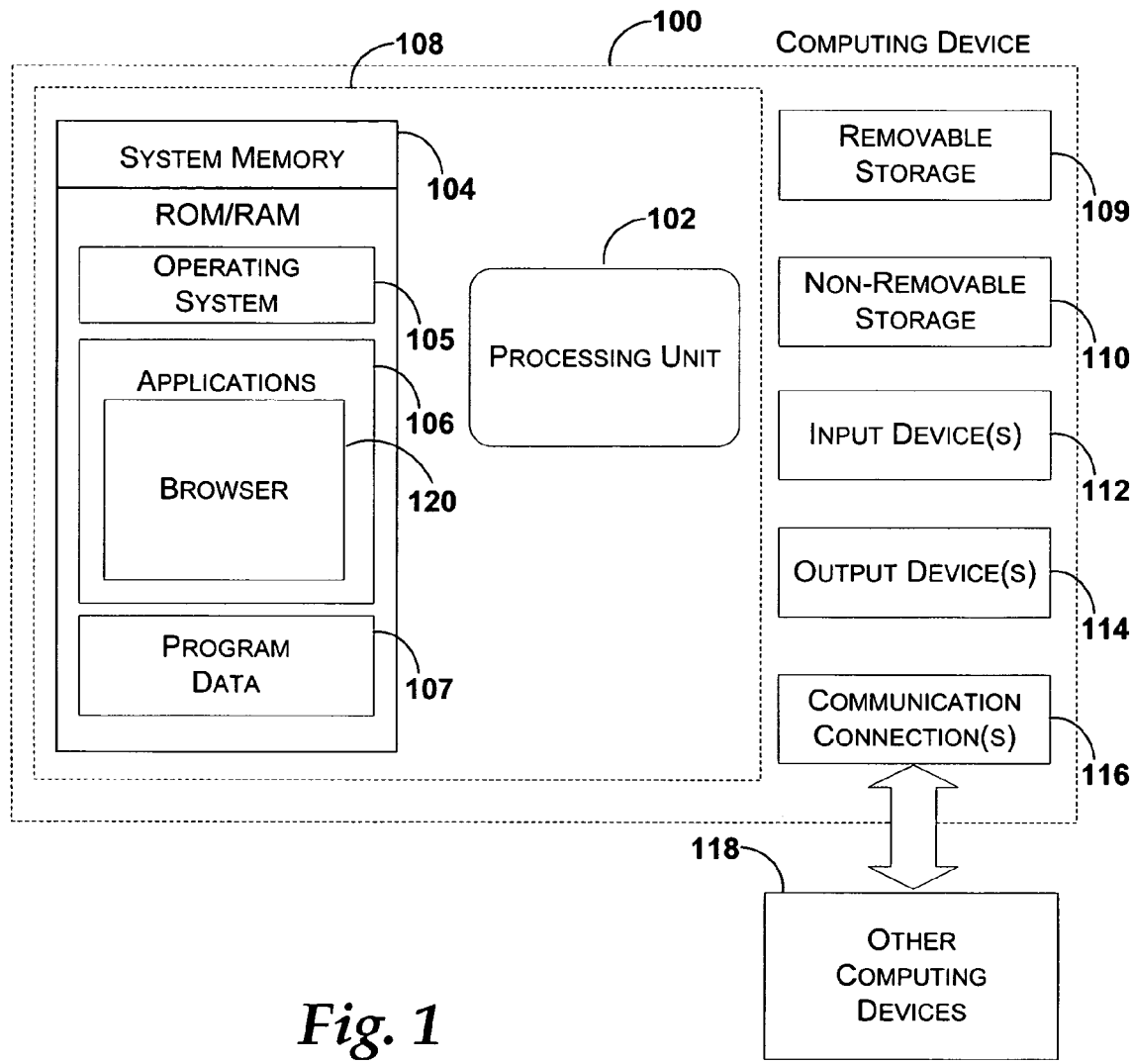
FIGS. 1 and 2 illustrate an exemplary computing devices that may be used in exemplary embodiments of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include browser application 120 that is configured to receive real time data that has been processed by a central server. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or .other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
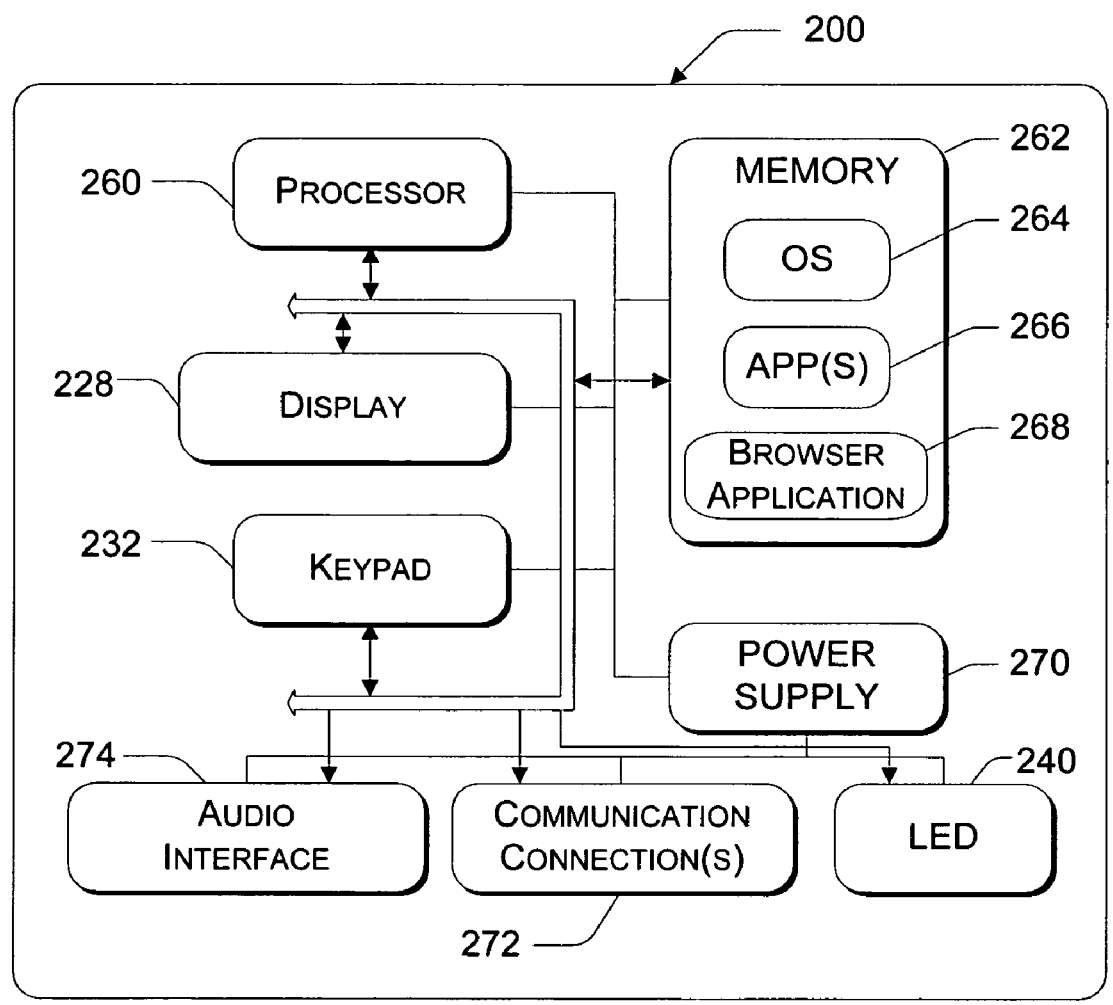

FIG. 2 illustrates a mobile computing device that may be used in one exemplary embodiment of the present invention. With reference to FIG. 2, one exemplary system for implementing the invention includes a mobile computing device, such as mobile computing device 200. Mobile computing device 200 includes processor 260, memory 262, display 228, and keypad 232. Memory 262 generally includes both volatile memory (e.g., RAM) and non-volatile memory (e.g., ROM, Flash Memory, or the like). Mobile computing device 200 includes operating system 264, such as the Windows CE operating system from Microsoft Corporation, or another operating system, which is resident in memory 262 and executes on processor 260. Keypad 232 may be a push button numeric dialing pad (such as on a typical telephone), a multi-key keyboard (such as a conventional keyboard). Display 228 may be a liquid crystal display, or any other type of display commonly used in mobile computing devices. Display 228 may be touch-sensitive, and would then also act as an input device.

One or more application programs 266 are loaded into memory 262 and run on the operating system 264. A browser application resides on mobile computing device 200 and is programmed to interact with real time data that has been processed by a central server. Mobile computing device 200 also includes non-volatile storage 268 within memory 262. Non-volatile storage 268 may be used to store persistent information which should not be lost if mobile computing device 200 is powered down.

Mobile computing device 200 includes power supply 270, which may be implemented as one or more batteries. Power supply 270 might further include an external power source, such as an AC adapter or a powered docking cradle that supplements or recharges the batteries.

Mobile computing device 200 is shown with two types of optional external notification mechanisms: LED 240 and audio interface 274. These devices may be directly coupled to power supply 270 so that when activated, they remain on for a duration dictated by the notification mechanism even though processor 260 and other components might shut down to conserve battery power. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile computing device 200 also includes communications connection(s), such as a wireless interface layer, that performs the function of transmitting and receiving communications. Communications connection 272 facilitates wireless connectivity between the mobile computing device 200 and the outside world. According to one embodiment, transmissions to and from communications connection 272 are conducted under control of the operating system 264.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A computer-implemented method for providing real time data, comprising:
   monitoring external data sources from a first location;
   obtaining data from one or more of the external data sources at the first location;
   accessing a formula that is stored within a workbook at the first location that is used to perform a calculation using the obtained data; wherein the formula is initially provided from a second location and wherein the workbook is exposed as a real time data source;
   performing a calculation at the first location when determined;
   storing the calculation within the workbook;

delivering the calculation from the first location to applications at other locations that have registered for the real time data source; and updating each cell of a spreadsheet within each of the applications that is dependent upon the calculation.

2. The method of claim 1, wherein obtaining the data from the one or more of the external data sources comprises obtaining real time data from at least one of the external data sources.

3. The method of claim 2, wherein providing the ability to perform the calculation on the data, comprises providing a user with the ability to enter the formula within a spreadsheet at the second location, wherein the entered formula is applied at the first location when the calculation is performed.

4. The method of claim 2, wherein obtaining the data from the one or more data sources comprises obtaining the data at a server; performing the calculation on the server, and wherein each of the other applications are stored on different computers from the server.

5. The method of claim 4, wherein delivering the calculation to the applications comprises at least one of: establishing a direct connection with each of the applications and delivering the data through the direct connection; and broadcasting the data to each of the applications.

6. The method of claim 1, wherein obtaining the data from the one or more external data sources comprises obtaining the data from at least one of: a data store and real time data from at least one real time data source.

7. A computer-readable medium having computer-executable instructions for delivering real time data, the instructions comprising:

obtaining real time data from one or more data sources at a first location; wherein the one or more data sources are at a different location from the first location;

accessing a formula from a workbook that is stored at the first location;

performing a calculation on the real time data at the first location using the formula;

storing the calculation within the workbook;

exposing the workbook as a real time data source interface that exposes the calculation;

determining applications at other locations that have registered for the real time data source interface; and delivering data including the calculation to each registered application at the other locations; wherein the data including the calculation is used to update fields within each of the registered applications that is dependent upon the delivered data.

8. The computer-readable medium of claim 7, wherein providing the ability to perform the calculation on the data at the first location, comprises providing a user with the ability to enter a formula within a spreadsheet at one of the other locations, wherein the entered formula is applied at the first location when the calculation is performed.

9. The computer-readable medium of claim 7, wherein providing the ability to perform the calculation on the data at the first location, comprises allowing a user to supply a calculation that is to be applied to the real time data.

10. The computer-readable medium of claim 7, wherein performing the calculation when determined comprises automatically performing the calculation in response to obtaining the data.

11. The computer-readable medium of claim 10, wherein obtaining the real time data from the one or more data sources comprises obtaining the real time data at a server; performing the calculation on the server; and wherein the other applications are stored on a different computer from the server.

12. The computer-readable medium of claim 10, wherein delivering the data including the calculation to at least one application comprises establishing a direct connection with each of the applications and delivering the data through the direct connection.

13. The method of claim 10, wherein delivering the data including the calculation to the other applications comprises broadcasting the data.

14. A system for delivering real time data, comprising:

a real time data source configured to provide real time data from a location that is different from a first computing device and other computing devices; and the first computing device coupled to the real time data source, comprising a processor and a computer-readable medium;

an operating environment stored on the computer-readable medium and executing on the processor, and a first spreadsheet application operating under the control of the operating environment and operative to perform actions, including;

receive the real time data provided by the real time data source;

perform calculations on the real time data that is based upon a formula that is contained within a cell of the spreadsheet and wherein the formula is obtained from one of the other computing devices;

store the calculations within a workbook that is exposed as a real time data source; and deliver the calculations to applications that are on the other computing devices and that have registered for the real time data source.

15. The system of claim 14, wherein performing the calculations on the real time data on the first computing device comprises obtaining a formula from a cell from one of the other computing devises user of the second computing device that is used in the calculation.

16. The system of claim 15, wherein the spreadsheet application on the first computing device is configured to provide a real time data source interface that is configured to provide an interface to the other computing devices.

17. The system of claim 16, wherein obtaining the formula, comprises obtaining a formula within a spreadsheet, wherein the entered formula is applied to the real time data when the calculation is performed.

18. The system of claim 15, wherein delivering the real time data comprises establishing a direct connection between the first computing device and the other computing devices and delivering the real time data through the direct connection.

19. The system of claim 15, wherein delivering the real time data comprises broadcasting the data to the other computing devices.

20. The system of claim 14, wherein performing the calculations on the real time data comprises automatically performing the calculations in response to receiving the real time data.

* * * * *